F. C. L. G. SUSEMIHL & H. H. HEWITT,

Assignor, by mesne assignments, to the HEWITT BOX-LID CO.

Railway Axle-Box Lid.

No. 8,947. Reissued Oct. 28, 1879.

Attest:

W. L. Baker

C. R. Baker

INVENTORS:

Francis C. L. G. Susemihl.

Herbert H. Hewitt.

By P. C. Dyrenforth,

Attorney.

UNITED STATES PATENT OFFICE

FRANCIS C. L. G. SUSEMIHL AND HERBERT H. HEWITT, OF DETROIT, MICHIGAN, ASSIGNORS, BY MESNE ASSIGNMENTS, TO THE HEWITT BOX LID COMPANY, OF CHICAGO, ILLINOIS.

IMPROVEMENT IN RAILWAY-AXLE-BOX LIDS.

Specification forming part of Letters Patent No. 192,199, dated June 19, 1877; Reissue No. 8,947, dated October 28, 1879; application filed May 3, 1879.

*To all whom it may concern:*

Be it known that we, FRANCIS C. L. G. SUSEMIHL and HERBERT H. HEWITT, both of the city of Detroit, in the county of Wayne and State of Michigan, have invented a new and Improved Journal Oil-Box Cover for Railway-Cars; and we hereby declare the following to be a full, clear, and exact description thereof, reference being had to the accompanying drawings, of which—

Figure 1:
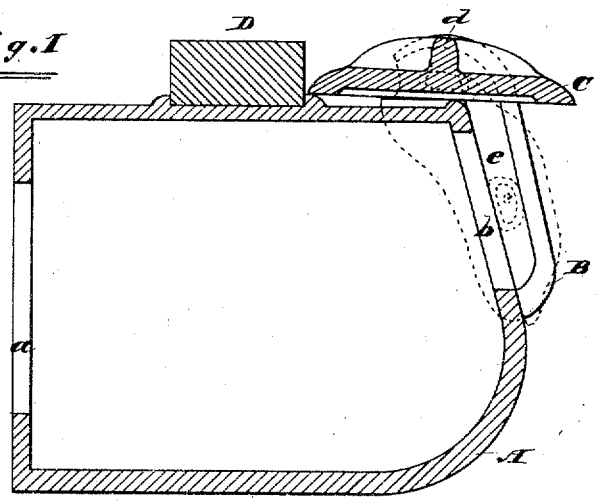
Figure 2:
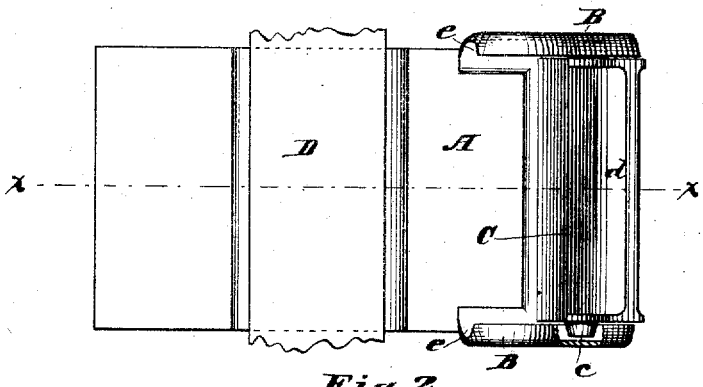

Figure 1 is a vertical longitudinal section on the line *x x* in Fig. 2, and Fig. 2 a plan view.

The object of our invention is to produce a journal-box cover for railway-cars which shall be easy to operate; which shall be incapable of being removed without first removing the box from the truck, thereby avoiding all possibility of its being lost; which, when once opened, shall remain open while the car is at rest, unless purposely closed, but be closed by the ordinary jarring of the car when the latter is in motion, and which shall comprise the smallest number of mechanical details consistent with the foregoing effects, and these of a nature least liable to become disarranged or broken.

Our invention consists, first, in having the lid permanently confined to the axle-box by means of guides and a stop, to prevent it from leaving the said guides, and open and close with a sliding action, and when opened pass over and rest upon the top of the axle-box; secondly, in having the sliding lid confined by means of guides to the axle-box, and restrained from becoming freed from the guides when opened by bringing up against the truck-irons on the top of the box; thirdly, in having the lid permanently confined by means of guides and a stop, as aforesaid, to the axle-box, and open and close with a sliding action, and when opened pass over and lie only partly upon the top of the axle-box, whereby the ordinary jarring of the car will serve to displace it and cause it to close again; and, furthermore, in the construction which we prefer for carrying our invention into effect, all as hereinafter more fully set forth.

In the drawings, A is an oil-box, consisting of a single casting having the aperture *a*, for receiving the car-axle, and the aperture *b*, for introducing the journal-box and for oiling. At the sides of the box flanges or ears B project a small distance beyond the front and above the top of the box, and are grooved in their inner surfaces, from a point opposite the lower corners of the aperture *b*, upward and rearward to the rear edge of the flange.

The cover C is provided with projections *c*, which are received by the grooves *e* of the flanges B. The cover C is provided with flanges at its ends, and with a central rib, *d*, on its outer side for convenience in opening or closing it.

An essential and novel feature of our invention is, that the lid when opened incidentally passes above the top of the journal-box, and brings up against the truck-iron on the top of the box, still being retained by the guides. Thus the lid can never be removed so long as the journal-box is in place in the truck, and there is therefore no danger of its being lost.

In the construction shown in the drawings, and which we are now describing, the distance between the truck-iron D and the flanges B (which latter here constitute the guides) is less than the distance from the projections *c* to the edge of the cover so long as the box is in place in the truck.

The aperture *b* is opened by raising the cover C until the projections *c* are in the upper ends of the grooves, when, as a result of the backward turn of the said grooves, the cover, upon being further pressed upward, is incidentally tipped, and at the same time carried so that it lies beyond its center upon the top of the box, whereby it cannot slide back unaided, but remains open, if permitted, so long as the car continues at rest. To close the aperture the cover is brought forward until its center of gravity is outside the top of the box, when it descends of itself; and should the oiler neglect to shut it, the jarring of the car will soon bring it forward sufficiently to cause it to fall.

While we recommend the above device as being, in our opinion, the best, we do not limit ourselves to the precise details of construction shown, either in the matter of the sliding lid or the guides which confine it, provided the general construction is such that the lid when raised is carried over upon the top of the journal-box, and is still prevented from becoming detached therefrom.

What we claim as new, and desire to secure by Letters Patent, is—

1. An axle-box lid which is confined by means of guides to the axle-box, and which opens and closes with a sliding action, and when opened passes over and rests upon the top of the axle-box, and which is permanently attached to the said axle-box, being restrained by a suitable stop from becoming freed from the said guides when opened, substantially as described.

2. A sliding axle-box lid confined by means of guides to the axle-box, and restrained from becoming freed from the guides when opened by bringing up against the truck-irons on top of the box, substantially as described.

3. An axle-box lid which is permanently confined to the axle-box by means of guides and a suitable stop to prevent it from leaving the guides, and which opens and closes with a sliding action, and when opened passes over and lies partly on the top of the axle-box, substantially as described, and for the purpose set forth.

4. The cover C, having flanged ends and a central rib, *d*, and provided with the projections *e*, substantially as and for the purpose described.

5. The cover C, having projections *e*, in combination with the box A, having formed upon it the grooved ears B, substantially as shown and described.

6. An axle-box lid having projections upon its edges midway, or thereabout, of its height, which projections are held by guides upon the axle-box, said guides having a backward direction at their upper ends, whereby, when the projections are, by the lifting of the lid, forced along the upper portion of the guides, the said lid incidentally tilts to a horizontal position and lies upon the top of the box, as set forth.

FRANCIS C. L. G. SUSEMIHL.
HERBERT H. HEWITT.

In presence of—
F. C. ADAMSON,
JAMES MILLER.